United States Patent
Sridhar (10) Patent No.: US 9,204,315 B2
(45) Date of Patent: Dec. 1, 2015

(54) METHOD OF COORDINATING FAULT DETECTION RESPONSES BY ACCESS NODES OF A NETWORK

(75) Inventor: Kamakshi Sridhar, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 786 days.

(21) Appl. No.: 13/163,814

(22) Filed: Jun. 20, 2011

(65) Prior Publication Data

US 2012/0320766 A1 Dec. 20, 2012

(51) Int. Cl.
*G01R 31/08* (2006.01)
*H04W 24/02* (2009.01)
*H04W 52/02* (2009.01)
*H04W 72/04* (2009.01)
*H04W 88/08* (2009.01)

(52) U.S. Cl.
CPC .......... *H04W 24/02* (2013.01); *H04W 52/0206* (2013.01); *H04W 72/0486* (2013.01); *H04W 88/08* (2013.01)

(58) Field of Classification Search
CPC .............................. H04W 24/02; H04W 24/04
See application file for complete search history.

(56) References Cited

U.S. PATENT DOCUMENTS

| | | | | |
|---|---|---|---|---|
| 6,496,475 | B1 * | 12/2002 | Ji et al. | 370/216 |
| 7,826,820 | B2 * | 11/2010 | Bjork et al. | 455/403 |
| 8,185,726 | B2 * | 5/2012 | Taha et al. | 713/1 |
| 8,498,207 | B2 * | 7/2013 | Trigui et al. | 370/235 |
| 8,605,684 | B2 * | 12/2013 | Hu et al. | 370/332 |
| 2006/0063521 | A1 * | 3/2006 | Cheung et al. | 455/423 |
| 2006/0128371 | A1 * | 6/2006 | Dillon et al. | 455/423 |
| 2006/0239224 | A1 * | 10/2006 | Borst et al. | 370/329 |
| 2008/0064361 | A1 * | 3/2008 | Bjork et al. | 455/403 |
| 2009/0006010 | A1 * | 1/2009 | Van Sloun et al. | 702/57 |
| 2009/0233595 | A1 * | 9/2009 | Harris et al. | 455/425 |
| 2010/0159930 | A1 * | 6/2010 | Hagerman et al. | 455/436 |
| 2010/0216453 | A1 * | 8/2010 | Kallin et al. | 455/424 |
| 2010/0234006 | A1 * | 9/2010 | Vadlamudi | 455/418 |
| 2010/0254274 | A1 * | 10/2010 | Westerberg et al. | 370/252 |
| 2010/0318652 | A1 * | 12/2010 | Samba | 709/224 |
| 2011/0037601 | A1 * | 2/2011 | Kumar et al. | 340/635 |
| 2011/0092195 | A1 * | 4/2011 | Hussein et al. | 455/418 |
| 2011/0096678 | A1 * | 4/2011 | Ketonen | 370/252 |
| 2011/0128916 | A1 * | 6/2011 | Kwon et al. | 370/328 |
| 2011/0134774 | A1 * | 6/2011 | Pelletier et al. | 370/252 |
| 2011/0136478 | A1 * | 6/2011 | Trigui | 455/418 |

(Continued)

FOREIGN PATENT DOCUMENTS

EP 2 154 918 A1 2/2010

OTHER PUBLICATIONS

PCT/US2012/041845 Search Report and Written Opinion dated Sep. 14, 2012.

(Continued)

*Primary Examiner* — Phirin Sam
(74) *Attorney, Agent, or Firm* — Davidson Sheehan LLP (57) ABSTRACT

The present invention provides a method of coordinating access nodes when a sleeping cell is detected. The method may include modifying a coverage area of an access node to compensate for lost coverage in a sleeping cell detected by the access node. The access node implements resource allocation algorithms and a cell identification algorithm. The method may also include instructing the resource allocation algorithms and/or the cell identification algorithm to perform a predetermined action concurrently with the modification.

30 Claims, 4 Drawing Sheets

(56) References Cited

U.S. PATENT DOCUMENTS

| | | | |
|---|---|---|---|
| 2011/0170516 A1* | 7/2011 | Hu et al. | 370/331 |
| 2011/0256833 A1* | 10/2011 | Racz et al. | 455/63.1 |
| 2012/0157089 A1* | 6/2012 | Yang et al. | 455/424 |
| 2012/0213057 A1* | 8/2012 | Zhang et al. | 370/216 |
| 2012/0295609 A1* | 11/2012 | Li et al. | 455/423 |
| 2012/0307697 A1* | 12/2012 | Mukhopadhyay | 370/311 |
| 2013/0286879 A1* | 10/2013 | ElArabawy et al. | 370/252 |

OTHER PUBLICATIONS

3rd Generation Partnership Project; Technical Specification Group Services and System Aspects; Telecommunication Management; Self-Organizing Networks (SON) Policy Network Resource Model (NRM) Integration Reference Point (IRP); Information Service (IS) (Release 10), 3GPP Standard; 3GPP TS 32.522, 3rd Generation Partnership Project (3GPP), Mobile Competence Centre; 650, Route des Lucioles; F-06921 Sophia-Antipolis Cedex; France, vol. SA WG5, No. V10.2.0, Jun. 17, 2011, pp. 1-33, XP05055325.

"Discussion on Energy Saving Enhancement", ZTE, China Unicorn, 3GPP TSG RAN WG3 #69, Aug. 23-27, 2010, 4 pages.

Huawei, "SON Overview in LTE-X", 3GPP TSG RAN WG3 #63bis, Mar. 23-26, 2009, 4 pages.

Huawei, "Response to R3-093105—Energy Savings Function in WCDMA", 3GPP TSG RAN3#66, Nov. 9-13, 2009, 4 pages.

* cited by examiner

METHOD OF COORDINATING FAULT DETECTION RESPONSES BY ACCESS NODES OF A NETWORK

BACKGROUND

This invention relates generally to communication systems, and, more particularly, to wireless communication systems.

Wireless communication systems use a network of access nodes to provide wireless connectivity to associated geographical areas that are typically referred to as cells or sectors. The access nodes in relatively advanced systems such as systems that implement the Long Term Evolution (LTE) standards and/or protocols are referred to as evolved node Bs (eNodeBs). However, the access nodes used in wireless communication systems may also be referred to using terms including base stations, base station routers, macrocells, access points, femtocells, pico-cells, and the like. Users access the wireless communication system using access terminals that communicate with one or more of the access nodes over an air interface. The access terminals may be mobile devices such as mobile phones, smart phones, notepad computers, network computers, and the like. The access terminals may also include comparatively immobile or fixed devices such as desktop computers, wireless interface cards or radios installed in other devices, and the like.

The access nodes may be configured as elements of a self-organizing network (SON). For example, eNodeBs in a wireless communication system that operates according to LTE may be self-organizing nodes of the network. Self-organizing eNodeBs should be capable of self-configuration, self-optimization, and self-healing. Self-configuration is executed automatically after the eNodeB is deployed and includes allocating an IP address to the eNodeB, authenticating and/or downloading configuration software from an operations and maintenance (OAM) server, establishing links over interfaces between the eNodeB and other eNodeBs in the self-organizing network, and the like. Self-optimization includes optimizing the configuration of the eNodeB based upon the location of the eNodeB and measurements of the actual air interface conditions and/or channel qualities. Self-healing allows the eNodeB to mitigate some detected faults by automatically triggering appropriate recovery actions.

One example of self-healing occurs when one or more access nodes in the network detect a sleeping cell. For example, in LTE, a sleeping cell is defined as an eNodeB that is no longer functioning and yet has not triggered an alarm at a corresponding OAM server. Sleeping cell conditions can be detected on a single carrier, on a subset of carriers, or for the entire cell. The neighboring access nodes can then take predetermined actions to compensate for the potential loss of coverage resulting from the detected sleeping cell. For example, the LTE standards and/or protocols define a cell outage detection and compensation (COC) procedure that allows eNodeBs to tilt one or more antennas to provide additional wireless coverage in the geographical area served by the sleeping cell. However, the sleeping cell compensation algorithms are defined in isolation of other algorithms that are being performed by the neighboring access nodes concurrently with the sleeping cell compensation algorithm.

SUMMARY OF EMBODIMENTS

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for coordinating access nodes when a sleeping cell is detected. The method may include modifying a coverage area of an access node to compensate for lost coverage in a sleeping cell detected by the access node. The access node implements resource allocation algorithms and a cell identification algorithm. The method may also include instructing the resource allocation algorithms and/or the cell identification algorithm to perform a predetermined action concurrently with the modification.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of techniques for coordinating actions and/or responses of access nodes in a network when a sleeping cell is detected in the network. When an access node detects a sleeping cell, either by performing measurements or being informed by the network, the access node can compensate for the loss of coverage caused by the sleeping cell, e.g., by tilting one or more antennas to provide additional coverage in the area served by the sleeping cell. However, the corrective actions are taken independently of other functions and/or algorithms that may be affected by the changing antenna radiation pattern. For example, shifting the antenna to improve coverage in areas served by the sleeping cell can degrade the quality of experience (QoE) for existing users being served by the access node, thereby decreasing their quality of experience. For another example, tilting the antenna may change the access nodes that are neighbors (or neighbor's neighbors) of the compensating access node. Shifting the antenna radiation pattern to compensate for lost sleeping cell coverage may therefore impact the algorithms that allocate physical cell identifiers to the access nodes and other resource allocation algorithms such as the call admission control algorithm and the load balancing algorithm.

At least in part to address these drawbacks in the conventional practice, the present application describes embodiments of access nodes that generate notifications to other algorithms when an access node modifies its antenna radiation pattern to compensate for lost coverage resulting from a sleeping cell. For example, notifications can be transmitted to physical cell identifier algorithms and/or resource allocation algorithms so that the operation or configuration of these algorithms can be modified to maintain a quality of experience for users served by the access node prior to modification of the antenna radiation pattern. Examples of algorithms that can be modified include the physical cell ID algorithm (which may be modified by running the algorithm to verify or change the current allocation of physical cell identifiers), the call admission control algorithm (which may be modified to allow new users only if the quality of experience of existing users is being met), and load-balancing algorithms (which may be modified to load balance traffic away from the access node in anticipation of new traffic from the coverage area of the sleeping cell).

Figure 1:
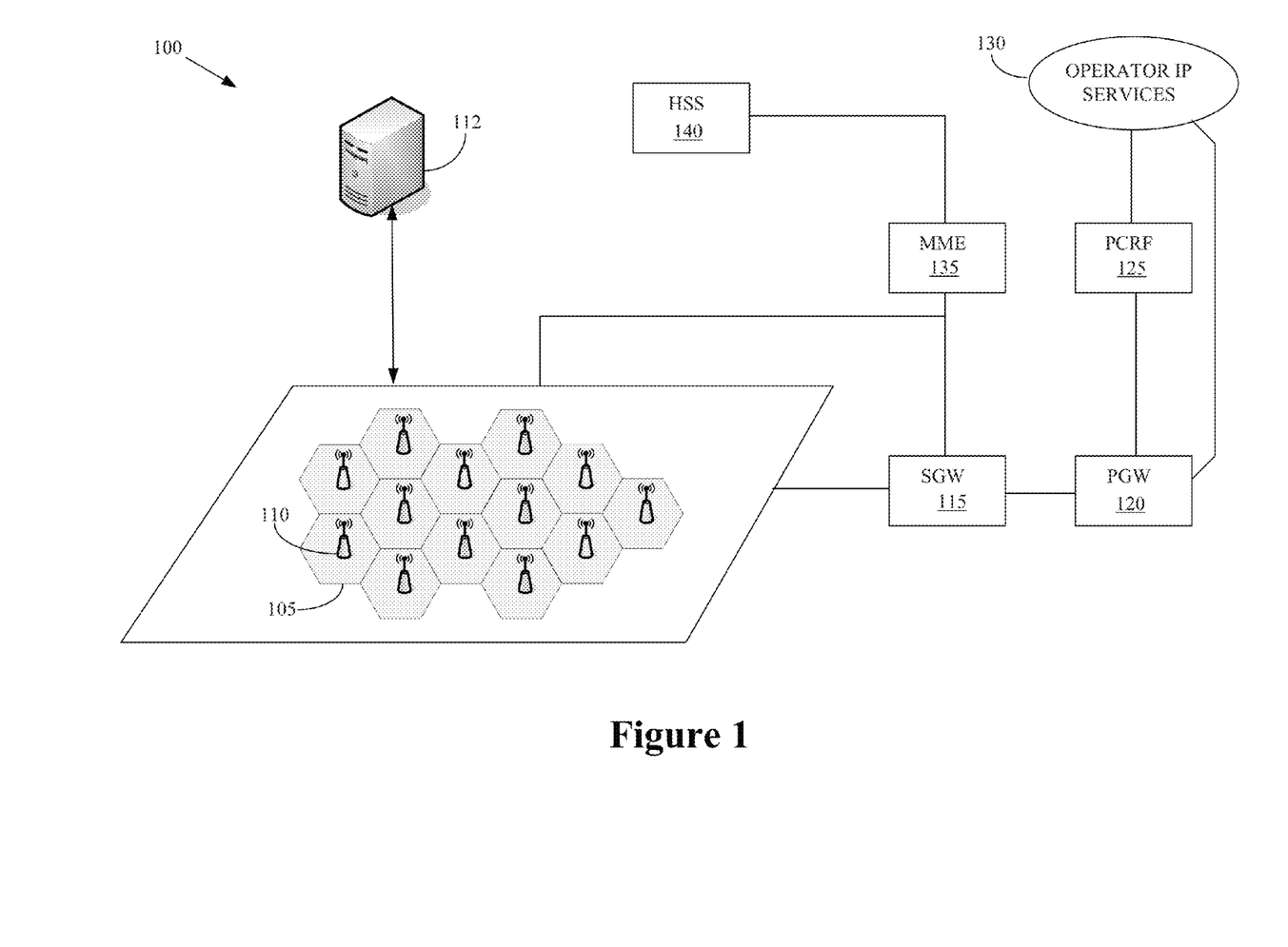
FIG. 1 conceptually illustrates a first exemplary embodiment of a wireless communication system.

FIG. 1 conceptually illustrates a first exemplary embodiment of a wireless communication system 100. In the illustrated embodiment, the wireless communication system 100 supports wireless connectivity in a plurality of cells or sectors 105 that are served by a corresponding plurality of access nodes 110. Wireless connectivity may be provided according to the Long Term Evolution (LTE) of the standards and/or protocols defined by the Third Generation Partnership Project (3GPP). However, persons of ordinary skill in the art having benefit of the present disclosure should appreciate that embodiments of the techniques described herein may be used in networks that operate according to other standards and/or protocols. For example, embodiments of these techniques may be used in second-generation (2G) and/or third generation (3G) networks that operate according to the corresponding standards and/or protocols.

In the illustrated embodiment, the access nodes 110 form a self-organizing network (SON) that operates according to LTE. The access nodes 110 may therefore be configured to self-configure, self-optimize and self-heal. Self-configuration is executed automatically after the access node 100 is deployed and includes allocating an IP address to the access node 100, authenticating and/or downloading configuration software from an operations and maintenance (OAM) server 112, establishing links over interfaces between each access node 100 and other access nodes 100 in the self-organizing network, and the like. Self-optimization includes optimizing the configuration of the access node 100 based upon the location of the access node 100 and measurements of the actual air interface conditions and/or channel qualities. Self-healing allows the access node 100 to mitigate some detected faults by automatically triggering appropriate recovery actions.

Access nodes 110 in the illustrated embodiment of the wireless communication system 100 are electronically and/or communicatively connected to one or more serving gateways (SGWs) 115 that route and forward user data packets. The serving gateways 115 may also act as the mobility anchor for the user plane during handovers and may be the anchor for mobility between LTE and other 3GPP technologies. Serving gateways may be electronically and/or communicatively coupled to one or more public data network (PDN) gateways (PGWs) 120 that provide connectivity to external packet data networks. The PGW 120 may perform policy enforcement, packet filtering for different users, charging support, and the like. For example, the PGW 120 may implement rules or policies provided by a policy and charging rules function (PCRF) 125, which may be electronically and/or communicatively coupled to one or more operators 130 for providing IP services. In the illustrated embodiment, the PGW 120 may also be electronically and/or communicatively coupled to the operator 130.

The SGW 115 may also be electronically and/or communicatively coupled to a mobility management entity (MME) 135. In the illustrated embodiment, the MME 135 is a control-node for the LTE access network and the MME 135 is responsible for idle mode user equipment (UE) tracking and paging procedure including retransmissions. The MME 135 may also support bearer activation/deactivation processes and may be responsible for choosing the SGW 115 for a UE at the initial attach and at time of intra-LTE handover. Non Access Stratum (NAS) signaling terminates at the MME 135 and the MME 135 may be responsible for generation and allocation of temporary identities to UEs. The MME 135 may also be responsible for other authorization, authentication, and mobility functions. In the illustrated embodiment, the MME 135 can authenticate the user by interacting with a home subscriber server (HSS) 140. In the illustrated embodiment, the HSS 140 is a central database that contains user-related and subscription-related information. The functions of the HSS 140 may include functionalities such as mobility management, call and session establishment support, user authentication, and access authorization.

One or more of the access nodes 110 may be identified as a sleeping cell when the access node 110 is no longer functioning but no alarm has been sent to or received by the OAM server 112. Depending on the circumstances, the sleeping cell condition may be detected on one carrier, on a subset of carriers, on a particular radio access technology (RAT), or on the entire cell 105. In the illustrated embodiment, the wireless communication system 100 implements an LTE Cell Outage Detection and Compensation (COC) procedure that allows neighboring access nodes 110 to detect a sleeping cell and compensate for the resulting loss of coverage, e.g., by adjusting the tilt of one or more antennas to modify the antenna radiation pattern and provide coverage to a portion of the coverage area of the sleeping cell 105. The illustrated embodiment of the wireless communication system 100 also supports an interaction mechanism between the CoC algorithm and other algorithms that may operate concurrently with the modifications triggered by detection of the sleeping cell. Exemplary algorithms that may be operating concurrently with the modifications include algorithms for allocating physical cell identifiers to the access nodes 110 and resource allocation algorithms such as call admission control algorithms, load-balancing algorithms, and the like. The wireless communication system 100 may therefore define one or more actions to be taken by the other algorithms in response to detecting a sleeping cell, e.g., actions that can be taken to maintain the QoE of existing users and/or increase the number of users with a required QoE.

Figure 2:
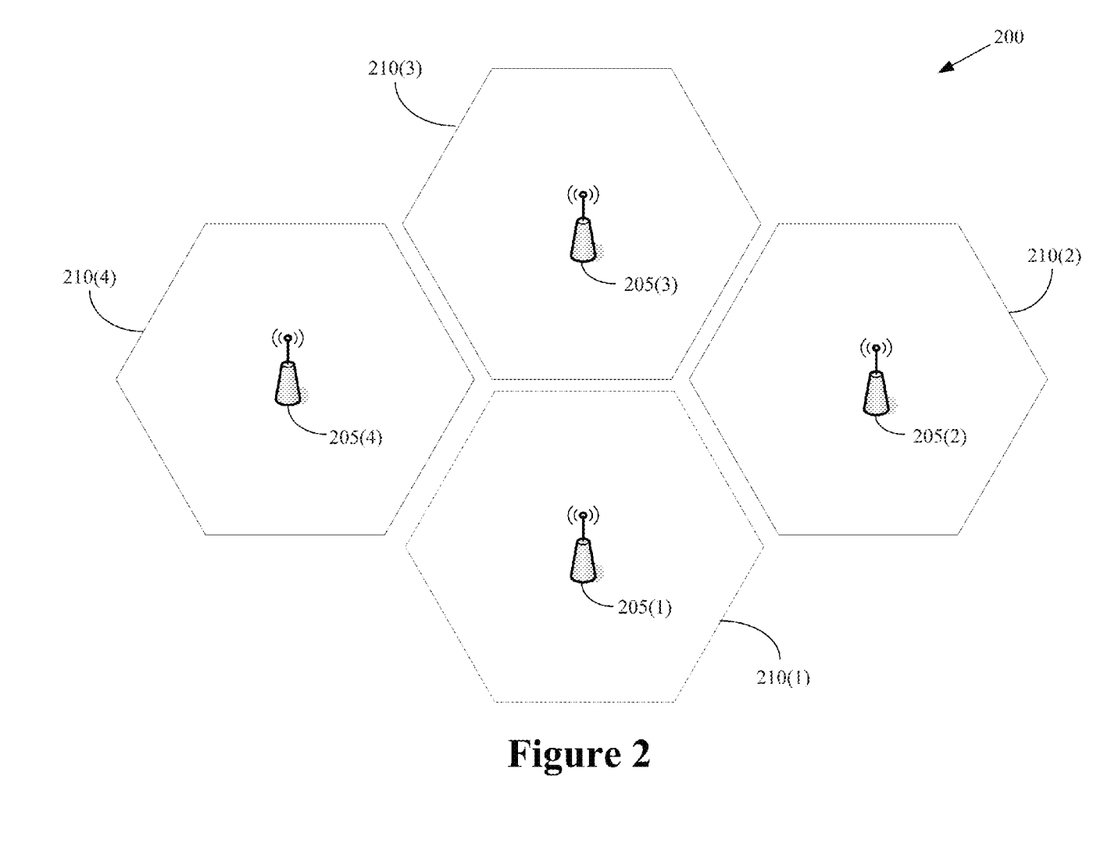
FIG. 2 conceptually illustrates a second exemplary embodiment of a wireless communication system.

FIG. 2 conceptually illustrates a second exemplary embodiment of a wireless communication system 200. The illustrated embodiment of the wireless communication system 200 includes a network of access nodes 205 that provide wireless connectivity within a corresponding network of cells 210. In the interest of clarity, the cells 210 are depicted as perfect non-overlapping hexagons. However, persons of ordinary skill in the art should appreciate that actual cells 210 may have irregular and time-varying shapes that may overlap in part or entirely with other cells 210. The cell 210(1) is a sleeping cell, as indicated by the dashed lines of the hexagon. One or more of the other cells 210(2-4) may therefore adjust their coverage patterns to compensate for the lost coverage, or hole in the coverage area, that results from the sleeping cell. However, modifying the coverage area, e.g., by modifying an antenna tilt to provide coverage in the sleeping cell 210(1), could degrade the QoE of existing users such as users that are being served by the cells 210(2-4). The degradation may be particularly acute if there are a large number of guaranteed bit rate (GBR) users being served by the compensating cells 210(2-4). Exemplary GBR services include voice calls, video conferencing, real-time gaming, and the like. Continuing to admit new users to the compensating cells 210(2-4) may further degrade the QoE of the existing users. Failing to account for interactions between the cell compensation algorithm and other SON mechanisms (such as allocating cell identifiers, call admission control, and load-balancing) could lead to poor QoE for users who should not be affected by events happening on other access nodes. Ignoring these potential interactions may also result in less-than-optimal use of network resources.

Figure 3:
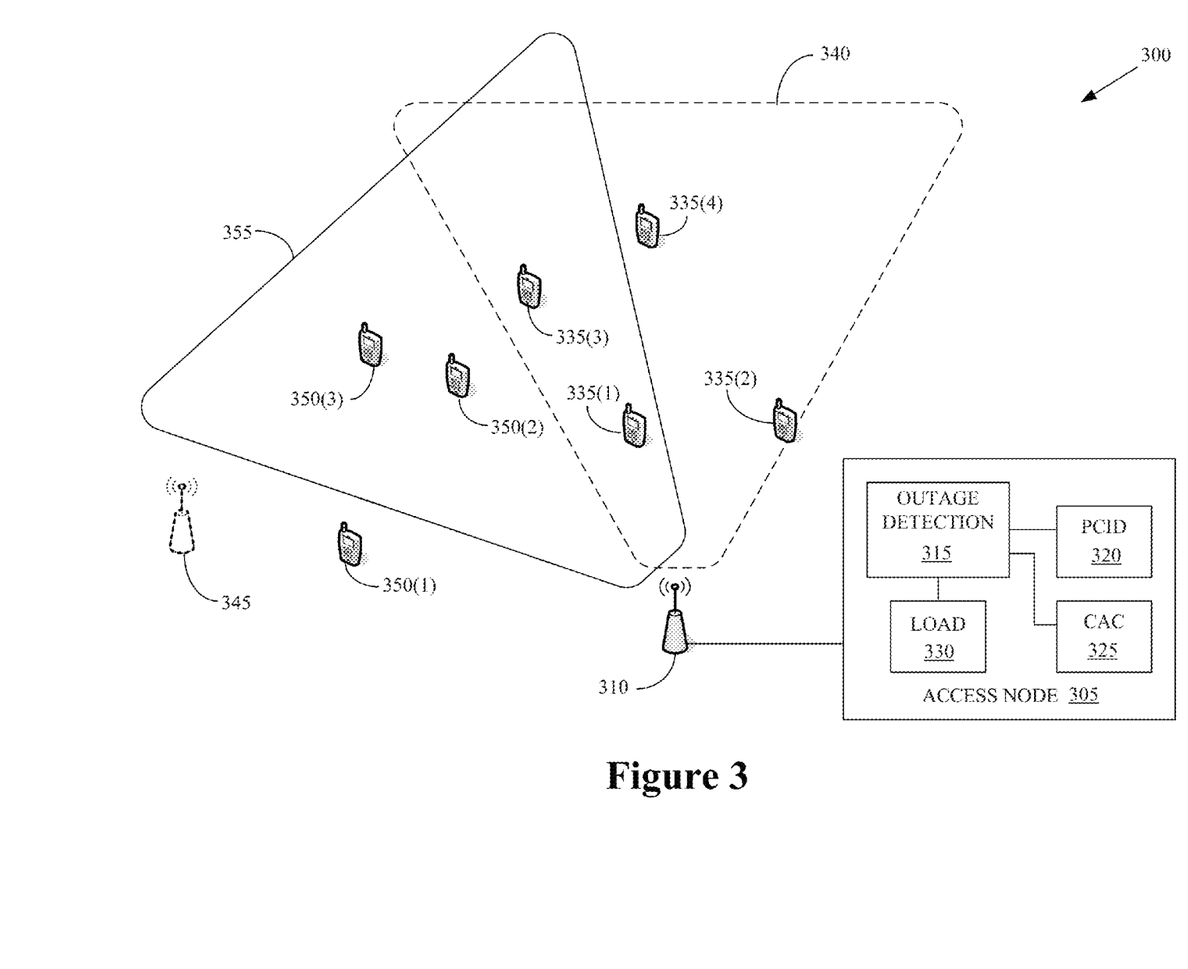
FIG. 3 conceptually illustrates a third exemplary embodiment of a wireless communication system.

FIG. 3 conceptually illustrates a third exemplary embodiment of a wireless communication system 300. In the illustrated embodiment, the wireless communication system 300 includes an access node 305 that provides wireless connectivity using one or more antennas 310. The access node 305 also implements functionality including an outage detection algorithm 315, a physical cell identifier algorithm 320, a call admission control algorithm 325, and a load-balancing algorithm 330. The outage detection algorithm 315 is configured to detect sleeping cells by monitoring and comparing statistics for events such as handovers during a selected period of time. Alternatively, the outage detection algorithm 315 may receive information indicating outages of one or more cells from the network. Outages can be detected on a single carrier, a subset of carriers, a particular RAT, or for the entire sleeping cell. The physical cell identifier algorithm 320 is configured to negotiate with other access nodes to allocate identifiers so that the identifiers are collision-free (e.g., neighboring access nodes do not have the same identifier) and confusion-free (e.g., a neighbor's neighbor of an access node does not have the same identifier). The call admission control algorithm 325 is configured to determine whether to admit requested calls or call sessions, e.g., based on the current loading of one or more carriers, sectors, and/or cells. The load-balancing algorithm 330 is configured to shift calls or call sessions between different carriers, sectors, and/or cells to redistribute or balance the load over the carriers, sectors, and/or cells.

The access node 305 is initially providing wireless connectivity to mobile nodes or other user equipment or access terminals 335 that fall within a coverage area defined by the radiation pattern 340 of the antenna 310. In the illustrated embodiment, the outage detection algorithm 315 determines that a neighboring cell 345 is a sleeping cell. The cell 345 may have been providing wireless connectivity to one or more mobile units 350. Alternatively, the mobile units 350 may not have an active session with the cell 345 but may be located in the geographical area previously served by the sleeping cell 345 and may later attempt to access the wireless communication system 300. The access node 305 may decide to compensate for the sleeping cell 345 by modifying its antenna tilt to provide coverage over at least a portion of the coverage hole created by the sleeping cell 345. Modifying the antenna tilt may modify the antenna radiation pattern 340 to generate a different antenna radiation pattern 355. Although FIG. 3 shows a single access node 310 compensating for the lost coverage, in alternative embodiments more than one neighboring cell may decide to modify its antenna tilt to compensate for the lost coverage of the sleeping cell 345.

The outage detection algorithm 315 may notify other algorithms that are concurrently operating in the access node 305 when the outage detection algorithm 315 detects the sleeping cell 345. The notifications make the other algorithms aware of the failure conditions in the sleeping cell 345 so that these algorithms can take appropriate action to mitigate the QoE impact on existing users such as the access terminals 335. The QoE of the users may be indicated by measured uplink bit rates, downlink bit rates, estimated air interface delays, packet loss, and the like. In various alternative embodiments, notifications and the corresponding actions taken by the algorithms may occur in each of the neighboring cells that detect the sleeping cell 345 and decide to compensate for the lost coverage. The notifications may include triggers that are sent to algorithms operating on the cell 305 that is compensating for the nearby cell outage. In one embodiment, these algorithms include the Physical Cell-ID algorithm 320, the call admission control algorithm 325, and the load-balancing algorithm 330, which may implement intra-carrier, inter-carrier and/or inter-radio access technology (RAT) load balancing algorithms.

In one embodiment, the triggers may instruct one or more algorithms to utilize different sets of thresholds. For example, the algorithms may download different sets of thresholds from a network source such as the OAM server depending on information obtained from incoming UE measurements of various QoE parameters. If the measurements indicate that the QoE of existing GBR users are being met, then one set of thresholds can be downloaded and used to configure the corresponding algorithm. However, if the measurements indicate that the QoE of existing GBR users are not being met as the compensation is being performed, then a different set of thresholds are downloaded and used to configure the corresponding algorithm. Persons of ordinary skill in the art should appreciate that the access node 305 may use individual measurements or statistical combinations of measurements to determine whether the QoE requirements are being met within specified tolerances.

The algorithms may then take the predetermined actions based on the new threshold values to meet the QoE of existing users while also attempting to maximize the number of users being served. For example, the PCID algorithm 320 may execute itself to ensure collision free and confusion free PCIs have been allocated. In some cases this may result in new identifiers being assigned to one or more access nodes including the access node 305, its neighbors, and/or its neighbor's neighbors. The call admission control algorithm 325 may implement a first threshold that allows only certain new GBR users 350 (e.g., non-voice users) when the QoE requirements of existing GBR users 335 are being met. The algorithm 325 may also implement a second threshold that indicates that the algorithm 325 may not admit any new GBR users 350 when the QoE requirements of existing GBR users 335 are not being met. The load balancing algorithm 330 may be configured using a set of thresholds to indicate that GBR traffic should be load balanced away from the carrier, subset of carriers, cell, and/or RATs that are compensating for the failure of the sleeping cell 345. The new thresholds may also indicate that new GBR traffic onto should not be allowed onto the compensating carrier, cell, or RAT. The type and the level of load balancing may depend on whether the sleeping cell condition is detected only on one carrier or RAT, or on all the carriers/RATs of the cell 345.

The predetermined actions of the algorithms supported by the access node 305 are selected to attempt to reduce the effects of the compensation on the QoE of the users 335 on the cell 305. In one embodiment, more than one cell may compensate for the sleeping cell 345 and in that case the predetermined actions can be executed on each of the compensating cells. The neighboring cells may also coordinate their actions. For example, the neighboring cells may participate in the physical cell allocation process so that collision-free and confusion-free identifiers are assigned to the cells. In one embodiment, the outage detection, compensation, notification, and predetermined actions may take place concurrently and/or substantially continuously. For example, the access node 305 may slowly tilt its antenna 310 to compensate for the detected sleeping cell 345, e.g., over a period of up to a few seconds. Notifications may therefore be sent at predetermined intervals or substantially continuously during the tilting process, e.g., every tenth or hundredth of a second, and the algorithms may modify their configuration/operation in response to each notification. This process may continue until a convergence criterion is met. For example, the process may continue until the antenna tilt has finished, collision-free and confusion-free identifiers have been allocated, call admission control according to the new thresholds has reached a relatively steady state, and the load-balancing algorithm has finished balancing the new and existing loads according to the new thresholds. Embodiments of these techniques may therefore reduce the impact of CoC on existing GBR users and provide tight coordination between Cell Outage Compensation and other mechanisms operating on the access node 305.

Figure 4:
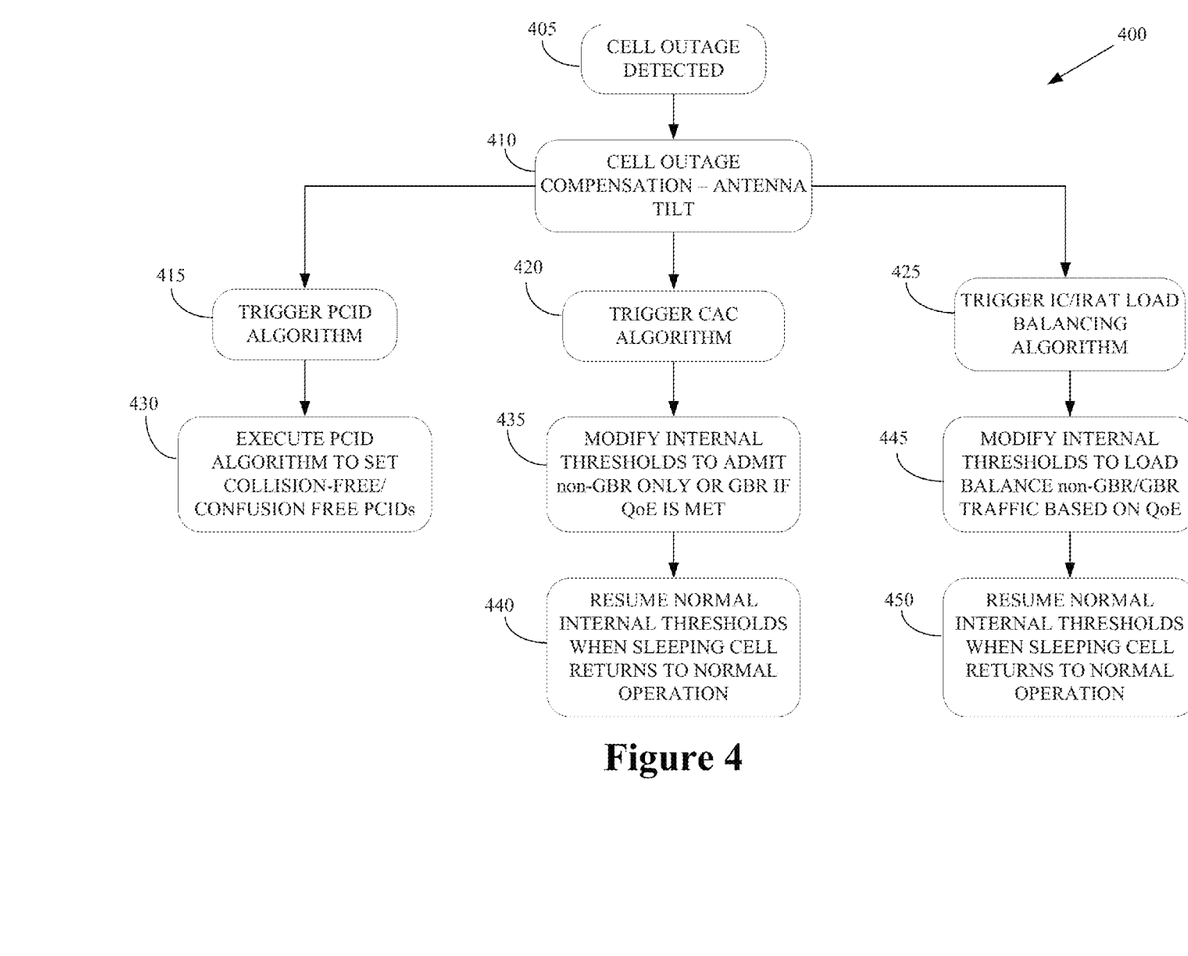
FIG. 4 conceptually illustrates one exemplary embodiment of a method of coordinating access nodes when a sleeping cell is detected in a wireless communication network.

FIG. 4 conceptually illustrates one exemplary embodiment of a method 400 of coordinating access nodes when a sleeping cell is detected in a wireless communication network. In the illustrated embodiment, a cell outage is detected (at 405) by one or more cells in the wireless communication network. For example, a cell (eNB_A) may detect that a nearby cell (eNB_B) has gone into outage on a specific carrier, subset of carriers, radio access technology, or combination thereof. Neighboring cells such as eNB_A can detect (at 405) a sleeping cell through the comparison of statistics of certain events, like handovers over a period of time. The neighboring cell eNB_A decides (at 410) to compensate for the sleeping cell through modification of its antenna tilt to provide coverage over the coverage hole detected for the sleeping cell eNB_B. In one embodiment, the level of tilt may be determined or gauged using UE measurement feedback such as measurements of radio link failures (RLFs). The neighboring cell eNB_A may then tilt its antenna until the measured values of the RLFs are less than a threshold value. For example, in embodiments of the wireless communication system that implement 3G and 4G base stations, the choice of antenna tilt is a tradeoff between providing adequate coverage while meeting the capacity and QoE requirements of individual UEs within the cell for the various carriers, e.g., as indicated by a packet delay budget and/or a measured packet loss error rate.

As the neighboring cell eNB_A performs the compensation process by tilting its antenna, the cell eNB_A may start receiving measurement values for the various users concurrently with the changing coverage caused by the compensation. The users may include users previously being served by the neighboring cell eNB_A and new users that request access in response to the changing coverage from the neighboring cell eNB_A. In various embodiments, the UE measurements may include measured uplink and/or downlink loads or bit rates. In one embodiment, the neighboring cell eNB_A can deduce other parameters such as the air interface delay and over-the-air packet loss for communications with the various users. Some of these UE measurements may be for users with guaranteed bit rate (GBR) services and other UE measurements may be collected for users with non-GBR services and/or best effort services.

Triggers may then be sent to one or more of the algorithms operating on the neighbor cell eNB_A so that these algorithms can be operated and/or configured consistently with the outage compensation. In the illustrated embodiment, triggers are sent (at 415, 420, 425) to at least three different algorithms operating on the neighboring cell concurrently with the actions that the neighboring cell is taking to compensate for the nearby cell outage. The algorithms implemented by the neighboring cell in the illustrated embodiment include a physical cell identifier algorithm, a call admission control algorithm, and a load balancing algorithm that can perform inter-carrier and/or inter-RAT load balancing. Instructions and/or thresholds may be downloaded or executed in response to receiving the triggers (at 415, 420, 425). In one embodiment, two different sets of thresholds may be downloaded from the OAM based on the information obtained from the incoming UE measurements. For example, one set of thresholds can be downloaded if the QoE of existing GBR users are being met. A different set of thresholds can be downloaded if the QoE of existing GBR users are not met. The QoE metrics considered may include measured uplink and/or downlink bit rates, estimated air interface delay, packet losses, or combinations thereof The algorithms may use the new threshold values to configure and/or carry out predetermined actions in an attempt to meet the QoE of existing users while maximizing the number of users being served.

In the illustrated embodiment, one of the triggers is sent (at 415) to the physical cell identifier algorithm. Changing the antenna radiation pattern to compensate for the coverage hole caused by the sleeping cell may change the list of neighbors to the neighboring cell eNB_A and the list of each neighbor's neighbors. The physical cell identifier algorithm therefore executes (at 430) in response to the trigger and determines whether any physical cell identifiers need to be modified to ensure collision-free and confusion-free identifiers. Changes in one cell identifier may ripple throughout the system and so physical cell identifier algorithms on other cells may also need to be executed response to the coverage compensation procedure. For example, the physical cell identifier algorithm on the neighboring cell eNB_A may communicate and/or negotiate with similar functionality on other cells to allocate the appropriate physical cell identifiers to ensure collision-free and confusion-free identifiers are allocated throughout the system.

A trigger may also be sent (at 420) to the call admission control algorithm. In the illustrated embodiment, the call admission control algorithm can then be reconfigured to admit or deny new users based upon a new set of thresholds. For example, the call admission control algorithm may either allow only certain new GBR users (such as non-voice users) or to deny any new GBR users depending on whether the QoE of existing GBR users are being met. In one embodiment, if the QoE of existing GBR users are being met, the trigger sent to the call admission control module may serve as an indication to the neighbor cell eNB_A that the current threshold values should be replaced with predetermined values that consider or account for failure scenarios in other cells, such as the sleeping cell eNB_B. The new triggers may be different from existing triggers because the new triggers are selected to account for changes that are likely to occur in response to failure of the sleeping cell eNB_B and the resulting compensation performed by the neighbor cell eNB_A. For example, even though the QoE of existing users are currently being met by the neighbor cell, the failure event that happened on the sleeping cell may trigger compensation that can degrade the QoE of the existing users. After receiving (at 420) this trigger, the call admission control algorithm on eNB_A requests (at 435) the appropriate thresholds from the OAM server and then modifies (at 435) its internal thresholds. Alternatively, the neighbor cell may have a predetermined set of thresholds stored internally and the neighbor cell may modify (at 435) the thresholds that it is using to control call admission by switching between the different sets of internally stored thresholds. These thresholds may have been previously downloaded from the OAM server. In one embodiment, the thresholds may be selected so that once they take effect the call admission control module only admits Best Effort users and in some cases certain non-voice GBR users, since admitting GBR users could result in the possibility that the QoE of new or existing users may not be met.

In one embodiment, the trigger received (at 420) by the call admission control module may indicate that new thresholds should be downloaded if the QoE of existing best effort users (e.g., as indicated by measured values of bit rates, delay, packet loss) are not being met because their values fall below a threshold. For example, the trigger sent (at 420) to the Call Admission Control module may indicate to the neighbor cell eNB_A that the current threshold values should be replaced with predetermined values that consider failure scenarios in other cells. This trigger may indicate that the QoE of existing users are not being met because of the failure event that happened on the sleeping cell, which caused the neighbor cell eNB_A to compensate. After receiving this trigger, the call admission control algorithm on the neighbor cell eNB_A can request the appropriate thresholds, which may be determined or selected based on the UE measurement reports coming in to the neighbor cell. The call admission control algorithm may then modify (at 435) its internal thresholds. In one embodiment, the new thresholds may be selected so that the call admission control module does not admit any new GBR users and only admits Best Effort users, since admitting GBR users may result in their QoEs not being met.

In some cases, the sleeping cell eNB_B may return to normal operation, perhaps because the cell has been repaired, replaced, or reconfigured so that it can operate normally. The neighbor cells may then detect the presence of the reactivated cell eNB_B and determine that the coverage hole has now been filled. The neighbor cell eNB_A may then resume (at 440) normal operation. For example, the neighbor cell eNB_A may tilt its antenna back to the original configuration. The neighbor cell eNB_A may also trigger the call admission control algorithm to reconfigure itself for normal operation, e.g., by downloading the appropriate thresholds. Reconfiguration of the call admission control algorithm may proceed iteratively and/or concurrently with the changing radiation pattern that results when the neighbor cell eNB_A resumes (at 440) normal operation.

Another trigger may be sent (at 425) to the load balancing algorithm. For example, a trigger may be sent (at 425) to a load balancing algorithm that can perform intra-carrier, inter-carrier, and/or inter-RAT load balancing algorithms. The type of load balancing performed by the algorithm may depend on whether the sleeping cell condition is detected on one carrier only, on multiple carriers, or on the entire cell including all carriers and RATs. In one embodiment, the trigger tells the load balancing algorithm that new traffic is expected as a consequence of the compensation for the detected sleeping cell. The load balancing algorithm may then modify (at 445) one or more internal thresholds so that traffic is preferentially load balanced away from carriers or RATs that are expected to receive new traffic. For example, if the sleeping cell condition is detected on all carriers and RATs, the intra-carrier LTE load balancing algorithm is notified so that it can load balance GBR traffic away from the cell eNB_A that is compensating for the failure. The load balancing algorithm may also be instructed to deny any requested new GBR traffic onto the neighbor cell eNB_A. Furthermore, in some cases GBR users on other eNBs may not be load balanced to eNB_A because eNB_A is serving nearby sleeping cell eNB_B, which is in outage.

In some cases, the sleeping cell condition may only be detected on a specific carrier and/or RAT. The trigger may therefore instruct the inter-carrier and/or inter-RAT load balancing algorithm to load balance GBR traffic away from the carrier and/or RAT on which sleeping cell condition is detected. The trigger may also instruct the load balancing algorithm to deny requested new GBR traffic for the carrier and/or RAT. Accordingly, internal thresholds in the inter-carrier/RAT load balancing algorithms may be modified (at 445) so that the load balancing algorithms perform the indicated load balancing operations. For example, various thresholds may be modified (at 445) so that the load balancing algorithm shifts existing GBR users on eNB_A to other carriers and/or to other RATs, perhaps on other cells. The target carriers and/or RATs for the load balancing operation may be selected so that the QoE of the load balanced user equipment has a higher likelihood of being met. The type and level of load balancing may depend on the severity of the QoE degradation experienced by the user equipment. In one embodiment, higher levels of QoE degradation result in more GBR users being load balanced to other carriers and/or RATs. Lower levels of QoE degradation may result in fewer (e.g., only voice) GBR users being load balanced away from the eNB_A.

If sleeping cell eNB_B returns to normal operation, the neighbor cells may then detect the presence of the reactivated cell eNB_B and determine that the coverage hole has now been filled. The neighbor cell eNB_A may then resume (at 450) normal operation. For example, the neighbor cell eNB_A may begin to tilt its antenna back to the original configuration. The neighbor cell eNB_A may also trigger the load balancing algorithm to reconfigure itself for normal operation, e.g., by downloading the appropriate thresholds. Reconfiguration of the load balancing algorithm may proceed iteratively and/or concurrently with the changing radiation pattern that results when the neighbor cell eNB_A resumes (at 440) normal operation.

Embodiments of the techniques described herein may have a number of advantages over conventional practice. For example, providing triggers to other algorithms in response to detecting a sleeping cell condition may allow the base station that compensates for the sleeping cell to maintain the QoE of the GBR users that are already being served by the base station that is compensating for one or more sleeping cells. Coordination of the different cell identifier and/or resource allocation algorithms may result in better QoE for all users and/or better optimization of resources to ensure that the QoE requirements of the users are being met with minimal resources. Furthermore, existing sleeping cell compensation techniques do not consider the impact of execution of the compensation algorithm on the other algorithms that are also in operation on the same base station. As a result, unexpected interactions may occur and lower the QoE of the users served on those base stations. Embodiments of the techniques described herein consider an account for these interactions so that any degradation in the QoE of the users may be reduced or avoided. Consequently, embodiments of the techniques described herein support a higher and more consistent level of QoE and improve performance for users.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method, comprising:
   detecting a sleeping cell at an access node;
   modifying at least one coverage area of the access node to compensate for lost coverage in the sleeping cell, wherein the access node implements resource allocation algorithms; and
   instructing the resource allocation algorithms to perform one of a plurality of predetermined actions concurrently with said modification depending on whether at least one quality of experience (QoE) is being met for at least one user.

2. The method of claim 1, wherein modifying said at least one coverage area comprises changing at least one tilt of at least one antenna used by the access node.

3. The method of claim 1, further comprising initiating a physical cell identifier algorithm to allocate collision-free and confusion-free physical cell identifiers to the access node and one or more neighboring access nodes.

4. The method of claim 1, comprising measuring the at least one QoE for the at least one user being served by the access node concurrently with modifying said at least one coverage area.

5. The method of claim 4, wherein measuring said at least one QoE comprises measuring at least one of an uplink bit rate, a downlink bit rate, an estimated air interface delay, or a packet loss rate for said at least one user.

6. The method of claim 1, wherein the access node concurrently modifies said at least one coverage area and instructs the resource allocation algorithms to perform the one of the plurality of predetermined actions substantially continuously until a convergence criterion is satisfied.

7. The method of claim 1, comprising:
   determining that the sleeping cell has awakened;
   modifying said at least one coverage area of the access node to account for resumed coverage in the previously sleeping cell; and
   instructing the resource allocation algorithms to perform another one of the plurality of predetermined actions concurrently with said modification.

8. The method of claim 7, wherein the access node concurrently modifies said at least one coverage area and instructs the resource allocation algorithms to perform the another one of the plurality of predetermined actions substantially continuously until a convergence criterion is satisfied.

9. The method of claim 1, further comprising instructing a load-balancing algorithm to load balance traffic away from the access node in response to said modification, wherein instructing the load-balancing algorithm to load balance traffic away from the access node comprises determining whether to perform load balancing on at least one user based on the at least one QoE for said at least one user and at least one likelihood that a target QoE for said at least one user will be met after load-balancing.

10. A method, comprising:
    modifying at least one coverage area of an access node to compensate for lost coverage in a sleeping cell detected by the access node, wherein the access node implements resource allocation algorithms and a cell identification algorithm; and
    instructing at least one of the resource allocation algorithms or the cell identification algorithm to perform a predetermined action concurrently with said modification, wherein instructing said at least one of the resource allocation algorithms to perform the predetermined action comprises instructing a call admission control algorithms to admit new guaranteed bit rate users when [said] at least one QoE is being met for said at least one user and instructing the call admission control algorithm to deny new guaranteed bit rate users when said at least one QoE is not being met for said at least one user.

11. The method of claim 10, wherein instructing the call admission control algorithms to admit or deny new guaranteed bit rate users comprises reconfiguring the call admission control algorithm using a first set of admission thresholds when said at least one QoE is being met for said at least one user and a second set of admission thresholds when said at least one QoE is not being met for said at least one user.

12. A method, comprising:
    detecting a sleeping cell at an access node, wherein the access node implements a load-balancing algorithm;
    modifying at least one coverage area of the access node to compensate for lost coverage in the sleeping cell; and
    instructing the load-balancing algorithm to load balance traffic away from the access node concurrently with said modification, wherein instructing the load-balancing algorithm to load balance traffic away from the access node comprises determining whether to perform load balancing on at least one user based on at least one measured quality of experience (QoE) for said at least one user and at least one likelihood that a target QoE for said at least one user will be met after load-balancing.

13. The method of claim 12, wherein determining whether to perform load balancing on said at least one user comprises load-balancing more traffic when a degradation in said at least one measured QoE is relatively large and load-balancing less traffic when the degradation is relatively small.

14. The method of claim 12, wherein detecting the sleeping cell comprises detecting a sleeping cell condition on at least one carrier or radio access technology supported by the sleeping cell.

15. The method of claim 14, wherein instructing the load-balancing algorithm to load balance traffic away from the access node comprises instructing the load-balancing algorithm to load balance traffic away from said at least one carrier or radio access technology that is experiencing the sleeping cell condition.

16. A method, comprising:
    detecting a sleeping cell at an access node, wherein the access node implements a cell identification algorithm;
    modifying at least one coverage area of the access node to compensate for lost coverage in the sleeping cell; and
    executing the cell identification algorithm in response to said modification.

17. The method of claim 16, wherein modifying said at least one coverage area comprises changing at least one tilt of at least one antenna used by the access node.

18. The method of claim 16, wherein executing the cell identification algorithm comprises executing the cell identification algorithm at the access node concurrently with executing cell identification algorithms at one or more neighboring access nodes to allocate collision-free and confusion-free cell identifiers to the access node and the one or more neighboring access node.

19. The method of claim 16, further comprising instructing at least one resource allocation algorithm to perform one of a plurality of predetermined actions concurrently with said modification depending on whether at least one quality of experience (QoE) is being met for at least one user.

20. The method of claim 19, further comprising instructing a load-balancing algorithm to load balance traffic away from the access node concurrently with said modification, wherein instructing the load-balancing algorithm to load balance traffic away from the access node comprises determining whether to perform load balancing on at least one user based on the at least one QoE for said at least one user and at least one likelihood that a target QoE for said at least one user will be met after load-balancing.

21. An access node, comprising:
    a computer system configured to detect a sleeping cell and modify at least one coverage area of the access node to compensate for lost coverage in the sleeping cell, wherein the computer system implements a resource allocation algorithm, and wherein the resource allocation algorithm performs one of a plurality of predetermined actions concurrently with the modification depending on whether at least one quality of experience (QoE) is being met for at least one user.

22. The access node of claim 21, further comprising:
    at least one antenna, wherein the computer system is configured to change at least one tilt of the at least one antenna to modify the at least one coverage area of the access node.

23. The access node of claim 21, wherein the computer system implements a physical cell identifier algorithm to allocate collision-free and confusion-free physical cell identifiers to the access node and one or more neighboring access nodes in response to modifying the at least one coverage area of the access node.

24. The access node of claim 21, wherein the computer system implements a call admission control algorithm to admit new guaranteed bit rate users when the at least one QoE is being met for the at least one user and deny new guaranteed bit rate users when the at least one QoE is not being met for the at least one user.

25. The access node of claim 24, wherein the computer system is configured to reconfigure the call admission control algorithm using a first set of admission thresholds when the at least one QoE is being met for the at least one user and a second set of admission thresholds when the at least one QoE is not being met for the at least one user.

26. The access node of claim 21, wherein the computer system is configured to determine that the sleeping cell has awakened, modify the at least one coverage area of the access node to account for resumed coverage in the previously sleeping cell, and instruct the resource allocation algorithm to perform another one of the plurality of predetermined actions concurrently with the modification performed in response to the sleeping cell awakening.

27. The access node of claim 21, wherein the computer system implements a load-balancing algorithm to load balance traffic away from the access node in response to the modification, and wherein the computer system is configured to instruct the load-balancing algorithm to determine whether to perform load balancing on at least one user based on the at least one QoE for the at least one user and at least one likelihood that a target QoE for the at least one user will be met after load-balancing.

28. An access node, comprising:
a computer system that implements a cell identification algorithm, wherein the computer system is configured to detect a sleeping cell, modify at least one coverage area of the access node to compensate for lost coverage in the sleeping cell, and execute the cell identification algorithm in response to the modification.

29. The access node of claim 28, further comprising:
at least one antenna, and wherein the computer system is configured to change at least one tilt of at least one antenna used by the access node.

30. An access node, comprising:
a computer system that implements a load-balancing algorithm, wherein the computer system is configured to detect a sleeping cell, modify at least one coverage area of the access node to compensate for lost coverage in the sleeping cell, and instruct the load-balancing algorithm to load balance traffic away from the access node concurrently with the modification, wherein instructing the load-balancing algorithm to load balance traffic away from the access node comprises determining whether to perform load balancing on at least one user based on at least one measured quality of experience (QoE) for the at least one user and at least one likelihood that a target QoE for the at least one user will be met after load-balancing.

* * * * *